United States Patent
Pal

(10) Patent No.: US 10,827,386 B2
(45) Date of Patent: Nov. 3, 2020

(54) DEVICE AND METHOD FOR INTEGRATING SATELLITE DATA WITH TERRESTRIAL NETWORKS IN A VEHICLE SYSTEM

(71) Applicant: DISH Network L.L.C., Englewood, CO (US)

(72) Inventor: Rajiv Singh Cullen Pal, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 16/230,124

(22) Filed: Dec. 21, 2018

(65) Prior Publication Data

US 2019/0208443 A1   Jul. 4, 2019

Related U.S. Application Data

(60) Provisional application No. 62/611,260, filed on Dec. 28, 2017.

(51) Int. Cl.

| | |
|---|---|
| *H04B 7/00* | (2006.01) |
| *H04W 28/08* | (2009.01) |
| *H04W 4/44* | (2018.01) |
| *H04W 40/34* | (2009.01) |
| *H04W 64/00* | (2009.01) |
| *H04W 4/48* | (2018.01) |
| *H04W 4/40* | (2018.01) |
| *H04W 4/02* | (2018.01) |
| *H04W 88/10* | (2009.01) |

(52) U.S. Cl.
CPC ........... *H04W 28/08* (2013.01); *H04W 4/023* (2013.01); *H04W 4/40* (2018.02); *H04W 4/44* (2018.02); *H04W 4/48* (2018.02); *H04W 40/34* (2013.01); *H04W 64/00* (2013.01); *H04W 88/10* (2013.01)

(58) Field of Classification Search
CPC ......... H04W 28/08; H04W 4/48; H04W 4/44; H04W 4/40; H04W 88/10; H04W 64/00
See application file for complete search history.

(56) References Cited

U.S. PATENT DOCUMENTS

| | | | | |
|---|---|---|---|---|
| 7,885,218 B2 * | 2/2011 | Nishiwaki | ............ | G07B 15/063 340/995.27 |
| 9,674,880 B1 * | 6/2017 | Egner | ................... | H04W 4/029 |
| 2009/0138188 A1 * | 5/2009 | Kores | ................... | G01C 21/32 701/117 |

(Continued)

*Primary Examiner* — Abdelnabi O Musa
(74) *Attorney, Agent, or Firm* — Seed Intellectual Property Law Group LLP

(57) ABSTRACT

A base station device used with a vehicle includes a first transceiver which communicates with a first network, a second transceiver which communicates with a second network, and a third transceiver which communicates with devices within the vehicle. The base station device also includes a processor and a memory device that cause the base station device to: obtain types of traffic being transmitted or received by the devices within the vehicle, assign first priority values to the types of traffic being transmitted or received by each of the devices within the vehicle, assign second priority values to the devices within the vehicle; assign each of the types of traffic to the first transceiver or the second transceiver based on the first priority values and the second priority values, and redirect traffic to the first transceiver and to the second transceiver.

20 Claims, 3 Drawing Sheets

(56) References Cited

U.S. PATENT DOCUMENTS

2014/0164582 A1* 6/2014 Dawson ................ H04W 48/18
709/221
2017/0195324 A1* 7/2017 Yamamoto .......... H04L 63/0876

* cited by examiner

DEVICE AND METHOD FOR INTEGRATING SATELLITE DATA WITH TERRESTRIAL NETWORKS IN A VEHICLE SYSTEM

BACKGROUND

Technical Field

The present disclosure relates to data communications devices and methods. More particularly, the present disclosure relates to devices and methods that dynamically reroute data between satellite and terrestrial networks.

Description of the Related Art

Vehicles have included devices that communicate with cellular networks and devices that communicate with satellite networks. However, the devices that communicate with cellular networks and devices that communicate with satellite networks have not been integrated. Accordingly, it has not been possible to reroute data between the satellite and terrestrial networks.

BRIEF SUMMARY

The present disclosure teaches a base station device and method that enables data to be dynamically rerouted between satellite and terrestrial networks based on many factors including priority values assigned to various types of network traffic, and priority values assigned to various communication devices within a vehicle that transmit or receive such network traffic, which may be based on the respective locations of the communication devices within the vehicle. The data may be dynamically rerouted between the satellite and terrestrial networks based on many other factors including cost, network conditions, and weather conditions, for example.

A base station device used with a vehicle may be summarized as including a first transceiver which, in operation, communicates with a first network; a second transceiver which, in operation, communicates with a second network; a third transceiver which, in operation, communicates with one or more communication devices within the vehicle; one or more processors coupled to the first, second, and third transceivers; and one or more memory devices storing one or more programs that, when executed by the one or more processors, cause the base station device to: obtain a plurality of types of traffic being transmitted or received by the one or more communication devices within the vehicle; for each communication device of the one or more communication devices within the vehicle, assign one of a plurality of first priority values to each of the one or more types of traffic being transmitted or received by the communication device; assign one of a plurality of second priority values to each of the one or more communication devices within the vehicle; for each communication device of the one or more communication devices within the vehicle, assign each of the one or more types of traffic being transmitted or received by the communication device to one of the first transceiver and the second transceiver, based on the one of the plurality of first priority values assigned to the communication device, and the one of the plurality of second priority values assigned to each of the one or more types of traffic being transmitted or received by the communication device; redirect traffic of one or more types of traffic previously assigned to the first transceiver to the second transceiver; and redirect traffic of one or more types of traffic previously assigned to the second transceiver to the first transceiver.

The one or more programs stored by the one or more memory devices, when executed by the one or more processors, may cause the base station device to assign the one of the plurality of second priority values to each of the one or more communication devices within the vehicle based on a location within the vehicle of each of the one or more communication devices within the vehicle. The one or more programs stored by the one or more memory devices, when executed by the one or more processors, may cause the base station device to assign the one of the plurality of second priority values to each of the one or more communication devices within the vehicle using data defining a boundary of each of a plurality of zones within the vehicle, wherein one of the plurality of priority values is assigned to one of the plurality of zones. The one or more programs stored by the one or more memory devices, when executed by the one or more processors, may cause the base station device to: for each communication device of the one or more communication devices within the vehicle, assign each of the one or more types of traffic being transmitted or received by the communication device to one of the first transceiver and the second transceiver based on a cost of communication using the first network and a cost of communication using the second network. The one or more programs stored by the one or more memory devices, when executed by the one or more processors, may cause the base station device to: for each communication device of the one or more communication devices within the vehicle, assign each of the one or more types of traffic being transmitted or received by the communication device to one of the first transceiver and the second transceiver based on a speed of communication using the first network and a speed of communication using the second network.

The one or more programs stored by the one or more memory devices, when executed by the one or more processors, may cause the base station device to measure a volume of each of the one or more types of traffic being transmitted or received by each of the one or more communication devices within the vehicle, and a volume of each of one or more types of traffic being received by each of the one or more communication devices within the vehicle; and for each communication device of the one or more communication devices within the vehicle, assign each of the one or more types of traffic being transmitted or received by the communication device to one of the first transceiver and the second transceiver based on the volume of each of the one or more types of traffic being transmitted or received by each of the one or more communication devices within the vehicle, and the volume of each of one or more types of traffic being received by each of the one or more communication devices within the vehicle. The one or more programs stored by the one or more memory devices, when executed by the one or more processors, may cause the base station device to: for each communication device of the one or more communication devices within the vehicle, assign each of the one or more types of traffic being transmitted or received by the communication device to one of the first transceiver and the second transceiver based on utilization of the one or more processors. The one or more programs stored by the one or more memory devices, when executed by the one or more processors, may cause the base station device to: for each communication device of the one or more communication devices within the vehicle, assign each of the one or more types of traffic being transmitted or received by the communication device to one of the first transceiver and the second transceiver based on utilization of the first transceiver.

The one or more programs stored by the one or more memory devices, when executed by the one or more processors, may cause the base station device to: for each communication device of the one or more communication devices within the vehicle, assign each of the one or more types of traffic being transmitted or received by the communication device to one of the first transceiver and the second transceiver based on utilization of the second transceiver. The one or more programs stored by the one or more memory devices, when executed by the one or more processors, may cause the base station device to receive a message from the first network that enables access to pay-per-view content provided by the second network.

A communication method may be summarized as including obtaining, by a base station device, a plurality of types of traffic being transmitted or received by each of one or more communication devices within a vehicle; for each communication device of the one or more communication devices within the vehicle, assigning, by the base station device, one of a plurality of first priority values to each of the one or more types of traffic being transmitted or received by the communication device; assigning, by the base station device, one of a plurality of second priority values to each of the one or more communication devices within the vehicle; for each communication device of the one or more communication devices within the vehicle, assigning, by the base station device, each of the one or more types of traffic being transmitted or received by the communication device to one of the first transceiver and the second transceiver, based on the one of the plurality of first priority values assigned to the communication device, and the one of the plurality of second priority values assigned to each of the one or more types of traffic being transmitted or received by the communication device; redirecting, by the base station device, traffic of one or more types of traffic previously assigned to the first transceiver to the second transceiver; and redirecting, by the base station device, traffic of one or more types of traffic previously assigned to the second transceiver to the first transceiver. The assigning, by the base station device, of the one of the plurality of second priority values to each of the one or more communication devices within the vehicle may include assigning, by the base station device, the one of the plurality of second priority values to each of the one or more communication devices within the vehicle based on a location within the vehicle each of one or more communication devices.

The assigning, by the base station device, of the one of the plurality of second priority values to each of the one or more communication devices within the vehicle may include assigning, by the base station device, the one of the plurality of second priority values to each of the one or more communication devices within the vehicle using data defining a boundary of each of a plurality of zones within the vehicle, wherein one of the plurality of priority values is assigned to one of the plurality of zones. The assigning, by the base station device, of each of the one or more types of traffic being transmitted or received by the communication device to one of the first transceiver and the second transceiver may include assigning, by the base station device, each of the one or more types of traffic being transmitted or received by the communication device to one of the first transceiver and the second transceiver based on a cost of communication using the first network and a cost of communication using the second network. The assigning, by the base station device, of each of the one or more types of traffic being transmitted or received by the communication device to one of the first transceiver and the second transceiver may include assigning, by the base station device, each of the one or more types of traffic being transmitted or received by the communication device to one of the first transceiver and the second transceiver based on a speed of communication using the first network and a speed of communication using the second network.

The communication method may further include measuring a volume of each of the one or more types of traffic being transmitted or received by each of the one or more communication devices within the vehicle; and measuring a volume of each of one or more types of traffic being received by each of the one or more communication devices within the vehicle, wherein the assigning, by the base station device, of each of the one or more types of traffic being transmitted or received by the communication device to one of the first transceiver and the second transceiver includes assigning, by the base station device, each of the one or more types of traffic being transmitted or received by the communication device to one of the first transceiver and the second transceiver based on the volume of each of the one or more types of traffic being transmitted or received by each of the one or more communication devices within the vehicle, and the volume of each of one or more types of traffic being received by each of the one or more communication devices within the vehicle. The assigning, by the base station device, of each of the one or more types of traffic being transmitted or received by the communication device to one of the first transceiver and the second transceiver may include assigning, by the base station device, each of the one or more types of traffic being transmitted or received by the communication device to one of the first transceiver and the second transceiver based on utilization of the one or more processors. The assigning, by the base station device, of each of the one or more types of traffic being transmitted or received by the communication device to one of the first transceiver and the second transceiver may include assigning, by the base station device, each of the one or more types of traffic being transmitted or received by the communication device to one of the first transceiver and the second transceiver based on utilization of the first transceiver. The assigning, by the base station device, of each of the one or more types of traffic being transmitted or received by the communication device to one of the first transceiver and the second transceiver may include assigning, by the base station device, each of the one or more types of traffic being transmitted or received by the communication device to one of the first transceiver and the second transceiver based on utilization of the second transceiver.

The communication method may further include receiving, by the base station device, a message from the first network that enables access to pay-per-view content provided by the second network.

DETAILED DESCRIPTION

Figure 1:
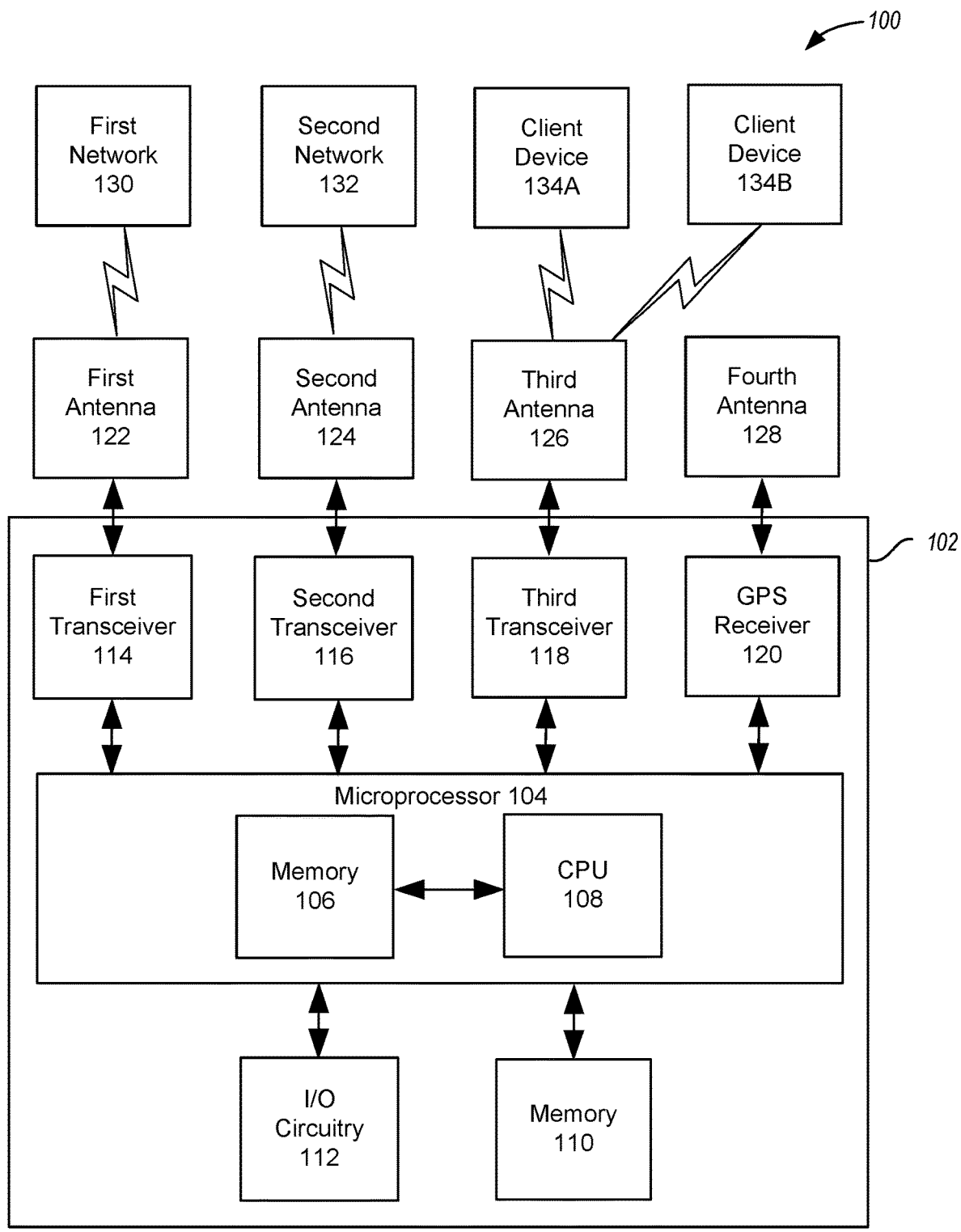
FIG. 1 is a block diagram of a communication system, according to one or more embodiments of the present disclosure.

FIG. 1 is a block diagram of a communication system 100, according to one or more embodiments of the present disclosure. The communication system 100 includes a base station device 102 that includes a microprocessor 104 having a memory 106 and a central processing unit (CPU) 108, a memory 110, input/output (I/O) circuitry 112, a first transceiver 114, a second transceiver 116, a third transceiver 118, and a Global Positioning Satellite (GPS) receiver 120.

The memory 110 stores processor-executable instructions that, when executed by the CPU 108, cause the base station device 102 to perform the functions described herein. The CPU 108 uses the memory 106 as a working memory while executing the instructions. In one or more embodiments, the memory 106 is comprised of one or more random access memory (RAM) modules. In one or more embodiments, the memory 110 is comprised of one or more non-volatile random access memory (NVRAM) modules, such as electronically erasable programmable read-only memory (EEPROM) or Flash memory modules, for example.

In one or more embodiments, the I/O circuitry 112 may include buttons, switches, dials, knobs, a touchscreen, or other user-interface elements for inputting commands to the communication system 100. The I/O circuitry 112 also may include a speaker, one or more light emitting devices, or other user-interface elements for outputting information or indications from the communication system 100. In addition, the I/O circuitry 112 may include one or more data interfaces, for example, a connection terminal that connects to an Ethernet cable, a connection terminal that connects to a USB cable, a connection terminal that connects to a coaxial cable, a connection terminal that connects to a standard subscriber telephone line, etc.

In one or more embodiments, the base station device 102 is disposed within an automobile and the I/O circuitry 112 is coupled to a car navigation system, for example, that includes self-driving functionality.

In one or more embodiments, the first transceiver 114 is configured to communicate via a first antenna 122 with a first network 130, such as a terrestrial, cellular network (e.g., Verizon, ATT, T-Mobile, etc.). For example, the first transceiver 114 is configured to transmit and receive radio frequency (RF) signals in accordance with one or more cellular communication standards (e.g., GSM, HSPA, LTE Advanced (4G), CDMA 2000, AMPS, etc.). In addition, the first transceiver 114 is configured to transmit and receive data packets in accordance with one or more data communication standards (e.g., ATM, ARP, ICMP, IP, UDP, TCP, IGMP, BGP, etc.). The first transceiver 114 may be an integrated circuit including circuitry configured to transmit RF signals and process data packets in accordance with one or more of the above standards.

In one or more embodiments, the second transceiver 116 is configured to communicate via a second antenna 124 with a second network 132, for example, a satellite-based network, such as the DISH Network. For example, the second transceiver 116 is configured to transmit and receive RF signals in accordance with one or more satellite communication standards (e.g., ETSI standards EN 303 980, EN 301 926, TR 103 297, TR 103 351, EN 303 413, EN 301 428, etc.). In addition, the second transceiver 116 is configured to transmit and receive data packets in accordance with one or more data communication standards (e.g., ARP, ICMP, IP, UDP, TCP, IGMP, BGP, etc.). The second transceiver 116 may be an integrated circuit including circuitry configured to transmit RF signals and process data packets in accordance with one or more of the above standards. In one embodiment, the second antenna 124 includes a controller that controls a motor or a phased-array of antenna elements to control the orientation of the second antenna 124 and/or directivity of RF signals transmitted and received via the second antenna 124.

In one or more embodiments, the third transceiver 118 is configured to communicate via a third antenna 126 with a first client device 134A and a second client device 134B that are members of a local area network (LAN) and/or a wireless (WLAN), which will be referred to collectively as client devices 134. In addition, the third transceiver 118 may include a data interface for wired network connections. Although only two client devices 134 are shown in FIG. 1, the present disclosure is not limited thereto. For example, the client devices 134 may include cell phones, tablet computers, laptop computers, gaming devices, navigation devices, vehicular control devices, etc. The third transceiver 118 may communicate with dozens, or hundreds, or more of client devices 134, for example. The client devices 134 may be located within in a vehicle such as a car, a ship, a plane, or a train. For example, the third transceiver 118 is configured to transmit and receive RF signals in accordance with one or more of Bluetooth (registered trademark), Z-wave (registered trademark), and IEEE 802.11 AC communication standards, etc.). In addition, the third transceiver 118 is configured to transmit and receive data packets in accordance with one or more data communication standards (e.g., ARP, ICMP, IP, UDP, TCP, IGMP, BGP, etc.). The third transceiver 118 is may be an integrated circuit including circuitry configured to transmit RF signals and process data packets in accordance with one or more of the above standards.

In one or more embodiments, the third antenna 126 may be integrated with the third transceiver 118. In one or more embodiments, the third transceiver 118 is configured to communicate via a plurality of third antennas 126 (e.g., 3). The third transceiver 118 and/or the CPU 108 may process signals received via the third antennas 126 and determine a location of each of the client devices 134, for example, using conventional time difference of arrival (TDOA) triangulation techniques.

The GPS receiver 120 is configured to receive signals via a fourth antenna 128 from GPS satellites (not shown) and determine a position of the GPS receiver 120, and by extension, the base station device 102. In one or more embodiments, the GPS receiver 120 and the fourth antenna 128 are conventional devices.

Figure 2:
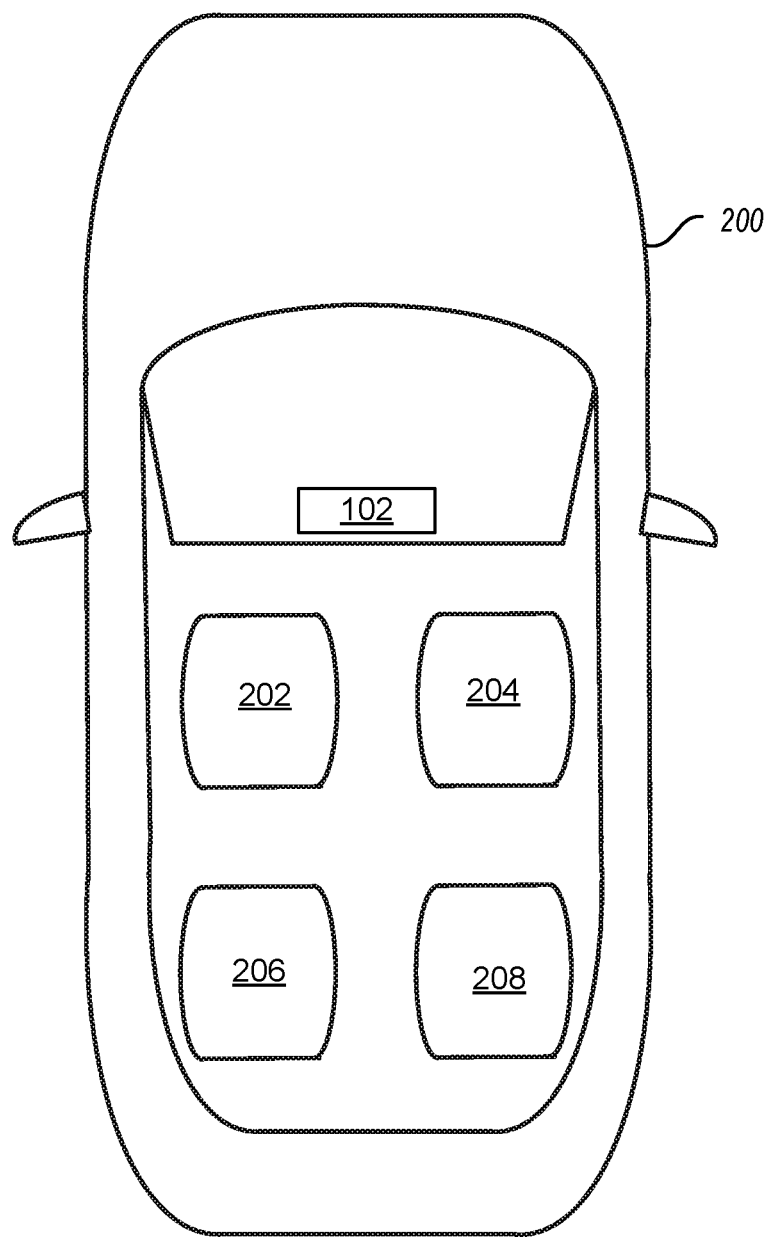
FIG. 2 is a diagram for explaining an example use of the communication system shown in FIG. 1, according to one or more embodiments of the present disclosure.

Having described the structure of the base station device 102, an example scenario in which the base station device 102 is used is described below with reference to FIG. 2. FIG. 2 shows an automobile 200 in which the base station device 102 is installed. The automobile 200 includes, among other things, a driver seat 202, a passenger seat 204, a first rear seat 206, and a second rear seat 208.

In the embodiment illustrated in FIG. 2, the base station device 102 is installed in the dashboard of the automobile 200. Additionally, the first antenna 122 and the second antenna 124 (not shown in FIG. 2) may be mounted on an exterior portion of the automobile 200 and may be coupled to the base station device 102 using wires or cables. In addition, the third antenna 126 (not shown in FIG. 2) may be mounted inside the automobile 200 and may be coupled to the base station device 102 using one or more wires or cables. In one or more embodiments, three third antennas 126 are mounted inside the automobile 200. For example, one third antenna 126 may be mounted in the dashboard of the automobile 200, one third antenna 126 may be mounted above the first rear seat 206, and one third antenna 126 may be mounted above the second rear seat 208.

The base station device 102 acts as a router and a gateway device for client devices 134 located in the automobile 200. For example, the third transceiver provides a local area network for devices (e.g., client devices 134) that are located within the automobile 200. The base station device 102 receives data packets that are for the devices (e.g., client devices 134) from the first network 130 via the first transceiver 114 and the second network 132 via the second transceiver 116, and transmits data contained in those packets within the automobile 200 to the devices (e.g., client devices 134) via the third transceiver 118. In addition, the base station device 102 receives via the third transceiver 118 data packets that are transmitted from the devices (e.g., client devices 134) that are located within the automobile 200 to devices on the Internet, for example, and transmits data contained in those packets to those devices via the first transceiver 114 and the second transceiver 116, respectively.

In one or more embodiments, the first network 130 statically or dynamically assigns a first address (e.g., IP address) to the first transceiver 114, which the first transceiver 114 uses to receive data packets from the first network 130. In other words, the first transceiver 114 receives from the first network 130 packets that include the first address in a destination address field of the headers of those packets. Similarly, the second network 132 statically or dynamically assigns a second address (e.g., IP address) to the second transceiver 116, which the second transceiver 116 uses to receive data packets from the second network 132. In other words, the second transceiver 116 receives from the second network 132 packets that include the second address in a destination address field of the headers of those packets. The base station device 102 functions as a Dynamic Host Configuration Protocol (DHCP) server for the client devices 134, and assigns IP addresses to the client devices 134. For example, the base station device 102 assigns a third address to the first client device 134A and assigns a fourth address to the second client device 134B.

In addition, the base station device 102 performs network address translation (NAT) for the client devices 134. For example, the first client device 134A generates a first packet that includes a header with a source address field set to the third address and a destination address field set to the address of a server on the Internet, and then transmits the first packet, which is received by the base station device 102 via the third transceiver 118. The base station device 102 then determines whether a type of the packet has been assigned to the first transceiver 114 or the second transceiver 116, as will be explained below. If the type of the packet has been assigned to the first transceiver 114, the base station device 102 modifies information in the header of the first packet such that the source address is the first address assigned by the first network 130 and transmits the modified first packet via the first transceiver 114. In addition, the base station device 102 modifies a value included in a port number field from a first value to a second value and stores the first value and second value so that a reverse process can be performed, as explained below. The server on the Internet replies to the first client device 134A by transmitting a second packet that includes a header with a source address field set to the address of the server and a destination address field set to the first address, which is received by the base station device 102 via the first transceiver 114. The base station device 102 then modifies the header of the second packet by setting the destination address field to the third address and by setting a port number field to the first value and transmits the modified packet to the first client device 134A via the third transceiver 118.

The base station device 102 stores configuration information indicating boundaries of each of a plurality of zones within the automobile 200. For example, if a zone is a rectangular area, the configuration information may include coordinate data for each corner of the rectangular area. The present disclosure is not limited to rectangular zones. For example, the base station device 102 stores configuration information defining a first zone that includes the driver seat 202 and the passenger seat 204, and a second zone that includes the first rear seat 206 and the second rear seat 208. By way of another example, the base station device 102 stores configuration information defining a first zone that includes the engine compartment of the automobile 200, a second zone that includes the dashboard of the automobile 200, a third zone that includes the driver seat 202, a fourth zone that includes the passenger seat 204, a fifth zone that includes the first rear seat 206, and a sixth zone that includes the second rear seat 208. The zones may be of different shapes and sizes.

In one or more embodiments, the base station device 102 stores configuration information that includes zone data stored in a file or other suitable data structure that associates a plurality of zone identifiers (e.g., "Front Seat", "Back Seat"), a plurality of priority values (e.g., "9" and "2") respectively corresponding to the plurality of zone identifiers, and coordinate data that defines a boundary of each of a plurality of zones corresponding to the zone identifiers (e.g., (X1, Y1), (X2, Y2), (X3, Y3), (X4, Y4); and (X5, Y5), (X6, Y6), (X7, Y7), (X8, Y8)). Accordingly, the base station device 102 may assign a priority value to the first client device 134A by first determining a set of coordinates of a location of the first client device 134A (e.g., using TDOA techniques, as mentioned above), then using that set of coordinates and the stored coordinate data that defines the boundary of each of the zones to determine in which of the zones the first client device 134A is located, then assigning the priority value that is associated with that zone to the first client device 134A.

Zones may be configured depending of the type of vehicle in which the base station device 102 is installed. For example, if the base station device 102 is installed in a train, zones may be defined to correspond to respective cars of the train, or portions thereof.

As will be explained below, the base station device 102 prioritizes communications within the automobile 200 based on the respective locations of the client devices 134. For example, if the first client device 134A is located in a zone corresponding to the passenger seat 204 and the second client device 134B is located in a zone corresponding to the first rear seat 206, the base station device 102 may prioritize communications to and from the first client device 134A over communications to and from the second client device 134B.

In addition, the base station device 102 prioritizes network traffic (e.g., data packets) based on a plurality of traffic types. For example, the base station device 102 may give the greatest priority to network traffic that is sent to and from an automated vehicular control system (e.g., device used to control a self-driving car), give the next greatest priority to navigation data (e.g., data to and from a network server that provides map data and driving directions), and may give a lowest priority to entertainment traffic (e.g., to and from a network server that provides music or audiovisual streams). The foregoing types of traffic are merely examples. The base station device 102 may prioritize network traffic in many different ways, as explained below.

Figure 3:
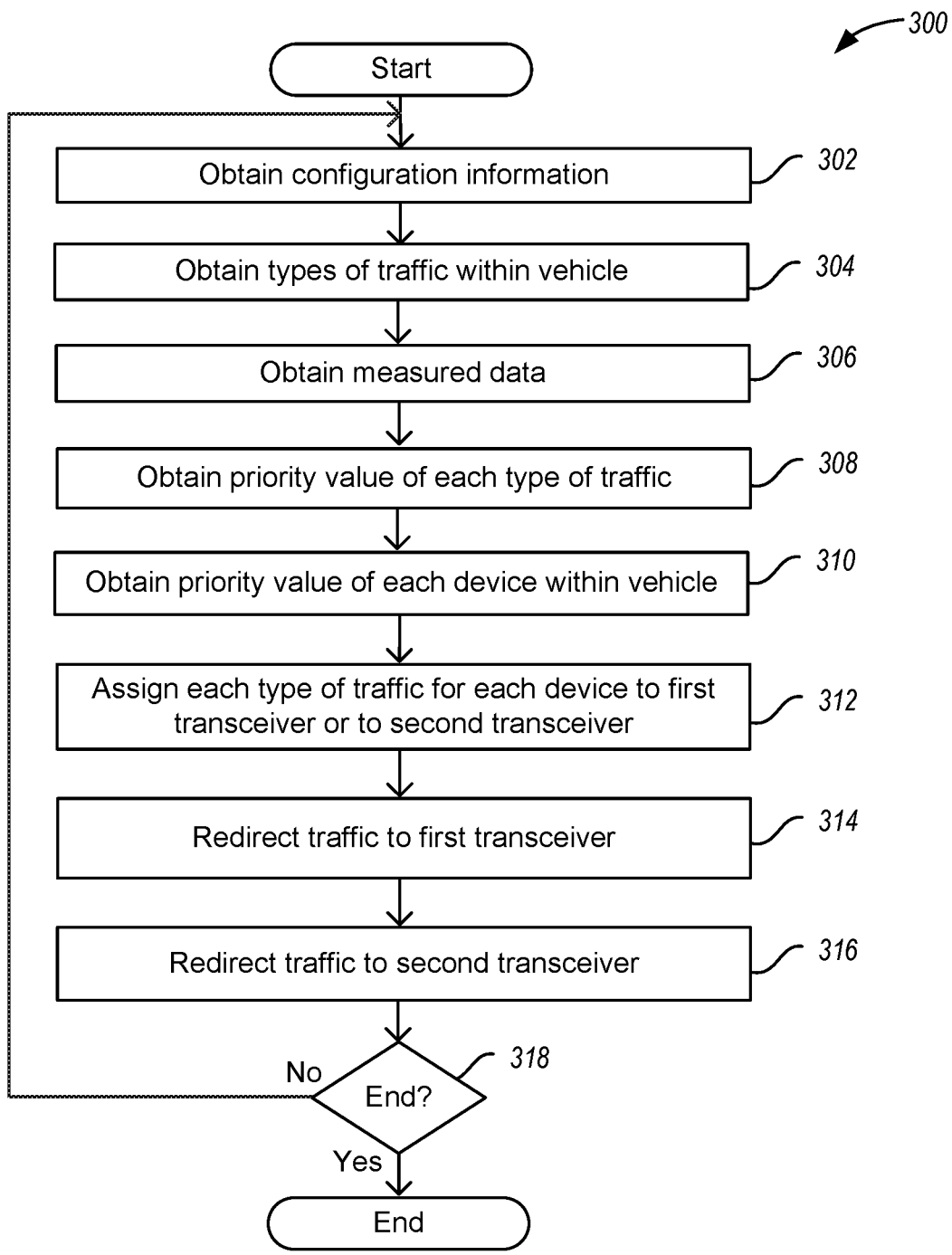
FIG. 3 is a flowchart of a method performed by the communication system shown in FIG. 1, according to one or more embodiments of the present disclosure.

FIG. 3 is a flowchart of a method 300, according to one or more embodiments of the present disclosure. The memory 106 and/or the memory 110 include one or more programs including computer-readable instructions that, when executed by the CPU 108 cause the base station device 102 to perform the method 300.

The method 300 begins at 302. At 302, the base station device 102 obtains configuration information. The base station device 102 can obtain the configuration information from the memory 110 and/or via the first, second, or third transceivers 114, 116, 118, for example.

The configuration information may include information regarding locations and operating statuses of devices of the first network 130, for example, respective cellular bases stations of the first network 130 that are within a predetermined range of the base station device 102. In addition, the configuration information may include information regarding weather conditions near where the base station device 102 is currently located or is expected to go, information regarding an operating status of devices of the second network 132, etc. In one or more embodiments, at least one of the client devices 134 executes an application that provides a graphical user interface (GUI) for selecting or inputting configuration options, which causes the client device 134 to transmit configuration information indicating those configuration options to the base station device 102, which are received via the third transceiver 118.

In one or more embodiments, the base station device 102 obtains configuration information that includes information regarding costs associated with using the first network 130 and the second network 132. For example, the configuration information received at 302 indicates a cost per unit volume of data, a per connection cost, a cost for monthly service (or other duration of time), etc. Such information regarding costs may include non-monetary costs. For example, time delay costs may be obtained at 302. For example, the time delay cost associated with each network may be obtained at 302. For example, if the first network 130 is a terrestrial, cellular network and the second network 132 is satellite network, a cost value obtained for the first network 130 is less than a cost value obtained for the second network 132 may be obtained at 302.

In one or more embodiments, the base station device 102 obtains configuration information that includes information regarding a speed of communication using the first network 130 and a speed of communication using the second network 132 at 302. For example, the configuration information received at 302 indicates a bit rate that the first network 130 guarantees and a bit rate that the second network 132 guarantees. In addition, such speed information may be based on measured data generated by the base station device 102, as described below.

In addition, the base station device 102 may obtain time delay costs at 302. The time delay costs are associated with each of the first network 130 and the second network 132. The configuration information received at 302 indicates an average delay value published by the operators of the first network 130 and an average delay value published by the operators of the second network 132. For example, if the first network 130 is a terrestrial, cellular network and the second network 132 is satellite network, a cost value obtained for the first network 130 may be less than a cost value obtained for the second network 132. In addition, such time delay cost information may be based on measured data generated by the base station device 102, as described below.

At 304, the base station device 102 obtains types of traffic within a vehicle, for example, the automobile 200 shown in FIG. 2. For example, the memory 110 stores files or other suitable data structures that associate one or more characteristics of packet headers or data contained within packets with each of a plurality of types of traffic. For example, such a file may include addresses (e.g., IP addresses) or other indicia (e.g., universal resource locators (URLs) of automobile control system servers and also include addresses (e.g., IP addresses) or other indicia of devices used to control self-driving cars, which are associated with a "Vehicle Control" type of data. By way of another example, such a file may include addresses (e.g., IP addresses) or other indicia (e.g., URLs, domain names) of maps and directions servers (e.g., www.google.com/maps) and also include addresses (e.g., IP addresses) or other indicia (e.g., IP port numbers) of applications that communicate with such servers (e.g., Google Maps App), which are associated with a "Navigation Data" type of data. By way of yet another example, such a file may include addresses (e.g., IP addresses) or other indicia (e.g., URLs, domain names) of audiovisual streaming servers (e.g., www.netflix.com) and also include addresses (e.g., IP addresses) or other indicia (e.g., IP port numbers) of applications that communicate with such servers (e.g., Netflix App), which are associated with an "Entertainment" type of data. The above examples types of data may be subdivided. For example, the "Entertainment" type of data may encompass "Sports", "Music", and "Video" types of traffic, which may be defined in similar ways.

At 306, the base station device 102 obtains measured data. For example, the base station device 102 may obtain a file or other suitable data structure that includes statistics generated by the base station device 102 indicating actual quantities of data per unit of time that have been transmitted and received using the first network 130 and the second network 132. By way of another example, the base station device 102 measures a volume of each of the types of traffic obtained at 304, which are received or transmitted via the first, second, and third transceivers 114, 116, 118 over a predetermined period of time. For example, the base station device 102 stores a file or other suitable data structure with criteria for each type of traffic (e.g., IP addresses, IP port numbers, URLs, etc.) and uses the information therein to identify each type of traffic sent to or received from the client devices 134 via the first, second, and third transceivers 114, 116, 118. In addition, the base station device 102 stores data indicating a volume or amount of data (e.g., information from Total Length if IP header) in a file or other suitable data structure. The resulting measurement data may be stored in the memory 106 and/or the memory 110.

By way of another example, the base station device 102 may obtain a file or other suitable data structure that includes statistics generated by the base station device 102 indicating actual delay values of traffic transmitted using the first network 130 and the second network 132. For example, the base station device 102 may use a standard (or modified) ping program the uses Internet Control Message Protocol (ICMP) echo request and echo reply messages to ping a predetermined server hosted by the first network 130 and use one or more delay values returned by the ping program. Similarly, the base station device 102 may use ICMP echo request and echo reply messages to ping a predetermined server hosted by the second network 132 and use one or more delay values returned by a ping program.

By way of yet another example, the base station device 102 may obtain a file or other suitable data structure that includes utilization statistics generated by the base station device 102 indicating respective utilization values corresponding to one or more of the CPU 108, the first transceiver 114, and the second transceiver 116.

At 308, the base station device 102 obtains a priority value of each type of traffic. For example, the base station device 102 reads a file that is stored in the memory 106 and/or the memory 110, wherein the file or a suitable data structure therein associates identifiers of each of a plurality of types of traffic with a plurality of corresponding priority values. For example, the priority values associated with the types of traffic may be integers ranging from 1 to 10, wherein a higher numeric value indicates a higher priority. Other priority values and ranges may be used without departing from the scope of the present disclosure.

At 310, the base station device 102 obtains a priority value of each of the client devices 134. For example, the base station device 102 reads a file that is stored in the memory 106 and/or the memory 110, wherein the file or a suitable data structure therein associates an address (e.g., IP address) of one of the client devices 134 with a priority value. This may be particularly useful for stationary devices that have wired connections to the base station device 102, as the location of those devices within a vehicle (e.g., automobile 200) does not change. The potential values of the priority values of the client devices 134 may be the same, or different, as those used for the types of traffic discussed above. Some of the information in such a file may be populated based on configuration information received via an application running on one of the client devices 134, for example.

Additionally or alternatively, the base station device 102 may dynamically determine which client devices 134 are within the automobile 200 and assign a priority value to each client device 134 based on a location thereof within the automobile 200. For example, the base station device 102 reads a file that is stored in the memory 106 and/or the memory 110, wherein the file or a suitable data structure therein associates a priority value with each of a plurality of zone identifiers, each of which is associated with coordinate data defining a plurality of zone with the automobile 200, as discussed above. In one or more embodiments, the zones do not overlap. In other words, each of the client devices 134 is deemed to be within only one zone at any given time.

At 312, the base station device 102 assigns each type of traffic obtained at 304 for each of the client devices 134 to the first transceiver 114 or to the second transceiver 116. The base station device 102 uses the information obtained by performing the acts described above to assigns each type of traffic obtained at 304 to the first transceiver 114 or to the second transceiver 116.

For example, the memory 106 and/or the memory 110 stores instructions that cause the CPU 108 to evaluate a plurality of predetermined formulas implementing predetermined algorithms, each having a number of variables, including weight values. The weight values may be scaled according to a priority value that is input to a function that implements the algorithm.

For example, the memory 106 and/or the memory 110 configuration information including the information shown in Table 1 below, in which a plurality of zone identifiers is associated a plurality of corresponding priority values and algorithm identifiers.

TABLE 1

| Zone Identifier | Priority Value | Algorithm Identifier |
| --- | --- | --- |
| Engine Compartment | 10 | Safety |
| Dashboard | 10 | Safety |
| Driver Seat | 8 | Performance |
| Passenger Seat | 6 | Performance |
| First Rear Seat | 4 | Cost |
| Second Rear Seat | 4 | Cost |

For example, if the first network 130 has a lower delay cost associated with it than the second network 132, the base station device 102 may assign a particular type of traffic (e.g., "Navigation") to and from a client device 134 that is located in the "Driver Seat" zone to the first network 130, and assign the same type of traffic to and from a client device 134 that is located in a "Passenger Seat" zone to the second network 132. If the base station device 102 is using the configuration information shown in Table 1, the base station device 102 gives the highest priority to a client device 134 (e.g., a navigation device used in a self-driving car) that is located in the "Dashboard" zone or the "Engine Compartment" zone, for example, by assigning types of traffic that are related to safety (e.g., "Vehicle Control" type of data discussed above) and/or navigation (e.g., "Navigation Data" type of data discussed above) to the transceiver that communicates the most reliably and/or the fastest and/or has the smallest delay associated therewith.

The base station device 102 may take other factors into consideration when assigning the types of traffic to the first transceiver 114 or to the second transceiver 116. For example, if the base station device 102 obtains at 302 configuration information indicating that, given the current location, speed, and heading of the automobile 200, the base station device 102 will soon be out of range of any cell towers of the first network 130, the base station device 102 may assign, or reassign, each type of traffic to the second transceiver 116 that communicates with the second network 132. By way of another example, if the base station device 102 obtains at 302 configuration information indicating that, given the current location, speed, and heading of the automobile 200, the base station device 102 will soon be in weather (e.g., heavy rain or hail) that will interfere with satellite communications with the second network 132, the base station device 102 may assign, or reassign, each type of traffic to the first transceiver 114 that communicates with the first network 130.

In one or more embodiments, the base station device 102 takes into account the current utilization of the CPU 108, the first transceiver 114, and/or the second transceiver 116. For example, if communication via the first transceiver 114 takes more processing time of the CPU 108 than communication via the second transceiver 116, and the CPU 108 is currently heavily utilized, the base station device 102 may assign, or reassign, types of traffic to the second transceiver 116. By way of another example, if the first transceiver 114 is currently being more heavily utilized than the second transceiver 116, the base station device 102 may assign, or reassign, types of traffic to the second transceiver 116. By way of yet another example, if the second transceiver 116 is currently being more heavily utilized than the first transceiver 114, the base station device 102 may assign, or reassign, types of traffic to the first transceiver 114.

In one or more embodiments, the base station device 102 obtains, at 302, configuration information including statistical information that indicates best times, ranges of time, days of the week, dates, ranges of dates, etc. for communicating over the first network 130 and the second network 132. For example, the microprocessor 104 includes a clock (not illustrated) that the CPU 108 uses to ascertain the current time, date, and/or day of the week. Accordingly, the base station device 102 can assign types of traffic to the first transceiver 114 and the second transceiver 116 using such statistics and the current time, date, and/or day of the week.

In one or more embodiments, the base station device 102 assigns the types of traffic to the first transceiver 114 and second transceiver 116 by storing in a file or other suitable data structure an identifier of each type of traffic (e.g., Entertainment) in association with an identifier of a corresponding one of the first transceiver 114 (e.g., "1") and second transceiver 116 (e.g., "2"). The base station device 102 may store two such files or data structures, wherein a first one stores default values or values of obtained the previous time the method 300 reached 312, and a second one stores values of obtained the current time the method 300 reaches 312. For example, the base station device 102 compares a first file with previously assigned values to a second file with currently assigned values, and notes any changes. For example, if an "Entertainment" type of traffic for the first client device 134A was previously assigned to the first transceiver 114 and is currently being assigned to the second transceiver 116, the base station device 102 stores a file or other suitable data structure for each client device 134 with information indicating that "Entertainment" type for the first client device 134A requires redirection.

At 314, the base station device 102 redirects each type of traffic, which was previously assigned to the second transceiver 116 and is currently being assigned to the first transceiver 114, to the first transceiver 114. For example, the base station device 102 receives a packet from the first client device 134A via the third transceiver 118 and determines the packet is of a type that should be redirected to the first transceiver 114. The base station device 102 sends an ICMP redirect message to the server (using the destination address included in the header of the packet) instructing the server to redirect that type of packet to the first address that the first transceiver 114 uses to receive traffic from the first network 130.

In one or more embodiments, the base station device 102 redirects one or more types of traffic by transmitting a message to a conditional access system. Such a conditional access system includes a conditional access databases storing data that associates information identifying content (e.g., title of a movie or other unique identifier that is associated the movie) and information identifying one of the client devices 134 (e.g., IP address or other unique identifier that is associated the client device 134).

For example, the base station device 102 stores an address of a first conditional access system hosted by the first network 130 and transmits a first message to the first conditional access system hosted by the first network 130 using that address, wherein the message requests that the first conditional access system update one or more record stored in a first conditional access database for a first pay-per-view (PPV) content item (e.g., first movie) so that an IP address that is associated with the first client device 134A is changed from the first address that the first transceiver 114 uses to receive traffic from the first network 130, to the second address that the second transceiver 116 uses to receive traffic from the second network 132. In response, the first conditional access system transmits a message using the first address to the first client device 134A, wherein the message includes at least one cryptographic key that enables the first client device 134A to descramble the first PPV content item (e.g., first movie).

Additionally, the base station device 102 stores an address of a second conditional access system hosted by the second network 132 and transmits a second message to the second conditional access system hosted by the second network 132 using that address, wherein the message requests that the second conditional access system update a records stored in a second conditional access database for a second PPV content item (e.g., second movie) so that an IP address that is associated with the first client device 134A is changed from the second address that the second transceiver 116 uses to receive traffic from the second network 132, to the first address that the first transceiver 114 uses to receive traffic from the first network 130. In response, the second conditional access system transmits a message using the first address to the first client device 134A, wherein the message includes at least one cryptographic key that enables the first client device 134A to descramble the second PPV content item (e.g., second movie).

In one or more embodiments, the first and second conditional access databases are merged. Thus, the base station device 102 can send messages to a single content access system to enable the client devices 134 to access content provided by both the first network 130 and the second network 132. Accordingly, the base station device 102 can receive a message from a content access system hosted by the first network 130 that enables access to PPV content provided by both the first network 130 and the second network 132. Similarly, the base station device 102 can receive a message from a content access system hosted by the second network 132 that enables access to PPV content provided by both the first network 130 and the second network 132.

If the base station device 102 does not determine that any type of traffic should be redirected to the first transceiver 114, the base station device 102 does not send any ICMP redirect messages and/or any message to content access systems, and the method 300 proceeds to 316.

At 316, the base station device 102 redirects each type of traffic, which was previously assigned to the first transceiver 114 and is currently being assigned to the second transceiver 116, to the second transceiver 116. For example, the base station device 102 receives a packet from the first client device 134A via the third transceiver 118 and determines the packet is of a type that should be redirected to the second transceiver 116. The base station device 102 sends an ICMP redirect message to the server (using the destination address included in the header of the packet) instructing the server to redirect that type of packet to the second address that the second transceiver 116 uses to receive traffic from the second network 132. The method 300 then proceeds to 318.

If the base station device 102 does not determine that any type of traffic should be redirected to the second transceiver 116 and/or any message to content access systems, the base station device 102 does not send any ICMP redirect messages, and the method 300 proceeds to 318.

At 318, the base station device 102 determines whether to end the method 300. For example, the base station device 102 determines whether it has received a signal or message from a device of the automobile 200 indicating that a driver of the automobile 200 has turned off the engine of the automobile 200. If the base station device 102 determines that is has not received the signal or message from the device of the automobile 200, the method 300 returns to 302 and is repeated. If the base station device 102 determines that it has received the signal or message from the device of the automobile 200, the method 300 ends.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A base station device used with a vehicle, the base station device comprising:
   a first transceiver which, in operation, communicates with a first network;
   a second transceiver which, in operation, communicates with a second network;
   a third transceiver which, in operation, communicates with a plurality of communication devices within the vehicle;
   one or more processors coupled to the first, second, and third transceivers; and
   one or more memory devices storing one or more programs that, when executed by the one or more processors, cause the base station device to:
      obtain information indicating a plurality of types of traffic being transmitted or received by the communication devices within the vehicle, wherein the information is different from the traffic, and the information includes, for each of the types of traffic, an identifier of a type of traffic that is associated with a characteristic of a header or data of a packet that transmits the type of traffic;
      for each communication device of the communication devices within the vehicle, assign one of a plurality of first priority values to each of the types of traffic that is included in the information and is being transmitted or received by the communication device;
      assign one of a plurality of second priority values to each of the communication devices within the vehicle;
      for each communication device of the communication devices within the vehicle, assign each of the types of traffic being transmitted or received by the communication device to one of the first transceiver and the second transceiver, based on the one of the plurality of first priority values assigned to the communication device, and the one of the plurality of second priority values assigned to each of the types of traffic being transmitted or received by the communication device;
      redirect traffic of one or more types of traffic previously assigned to the first transceiver to the second transceiver; and
      redirect traffic of one or more types of traffic previously assigned to the second transceiver to the first transceiver.

2. The base station device of claim 1 wherein the one or more programs stored by the one or more memory devices, when executed by the one or more processors, cause the base station device to:
   assign the one of the plurality of second priority values to each of the communication devices within the vehicle based on a location within the vehicle of each of the communication devices within the vehicle.

3. The base station device of claim 2 wherein the one or more programs stored by the one or more memory devices, when executed by the one or more processors, cause the base station device to:
   assign the one of the plurality of second priority values to each of the communication devices within the vehicle using data defining a boundary of each of a plurality of zones within the vehicle, wherein one of the plurality of priority values is assigned to one of the plurality of zones.

4. The base station device of claim 2 wherein the one or more programs stored by the one or more memory devices, when executed by the one or more processors, cause the base station device to:
   for each communication device of the communication devices within the vehicle, assign each of the types of traffic being transmitted or received by the communication device to one of the first transceiver and the second transceiver based on a cost of communication using the first network and a cost of communication using the second network.

5. The base station device of claim 3 wherein the one or more programs stored by the one or more memory devices, when executed by the one or more processors, cause the base station device to:
   for each communication device of the communication devices within the vehicle, assign each of the types of traffic being transmitted or received by the communication device to one of the first transceiver and the second transceiver based on a speed of communication using the first network and a speed of communication using the second network.

6. The base station device of claim 4 wherein the one or more programs stored by the one or more memory devices, when executed by the one or more processors, cause the base station device to:
   measure a volume of each of the types of traffic being transmitted or received by each of the communication devices within the vehicle, and a volume of each of the types of traffic being received by each of the communication devices within the vehicle; and
   for each communication device of the communication devices within the vehicle, assign each of the types of traffic being transmitted or received by the communication device to one of the first transceiver and the second transceiver based on the volume of each of the types of traffic being transmitted or received by each of the communication devices within the vehicle, and the volume of each of the types of traffic being received by each of the communication devices within the vehicle.

7. The base station device of claim 2 wherein the one or more programs stored by the one or more memory devices, when executed by the one or more processors, cause the base station device to:
   for each communication device of the communication devices within the vehicle, assign each of the types of traffic being transmitted or received by the communication device to one of the first transceiver and the second transceiver based on utilization of the one or more processors.

8. The base station device of claim 2 wherein the one or more programs stored by the one or more memory devices, when executed by the one or more processors, cause the base station device to:
   for each communication device of the communication devices within the vehicle, assign each of the types of traffic being transmitted or received by the communication device to one of the first transceiver and the second transceiver based on utilization of the first transceiver.

9. The base station device of claim 8 wherein the one or more programs stored by the one or more memory devices, when executed by the one or more processors, cause the base station device to:
for each communication device of the communication devices within the vehicle, assign each of the types of traffic being transmitted or received by the communication device to one of the first transceiver and the second transceiver based on utilization of the second transceiver.

10. The base station device of claim 2 wherein the one or more programs stored by the one or more memory devices, when executed by the one or more processors, cause the base station device to:
receive a message from the first network that enables access to pay-per-view content provided by the second network.

11. A communication method comprising:
obtaining, by a base station device, information indicating a plurality of types of traffic being transmitted or received by each of a plurality of communication devices within a vehicle, wherein the information is different from the traffic, and the information includes, for each of the types of traffic, an identifier of a type of traffic that is associated with a characteristic of a header or data of a packet that transmits the type of traffic;
for each communication device of the communication devices within the vehicle, assigning, by the base station device, one of a plurality of first priority values to each of the types of traffic that is included in the information and is being transmitted or received by the communication device;
assigning, by the base station device, one of a plurality of second priority values to each of the communication devices within the vehicle;
for each communication device of the communication devices within the vehicle, assigning, by the base station device, each of the types of traffic being transmitted or received by the communication device to one of the first transceiver and the second transceiver, based on the one of the plurality of first priority values assigned to the communication device, and the one of the plurality of second priority values assigned to each of the types of traffic being transmitted or received by the communication device;
redirecting, by the base station device, traffic of one or more types of traffic previously assigned to the first transceiver to the second transceiver; and
redirecting, by the base station device, traffic of one or more types of traffic previously assigned to the second transceiver to the first transceiver.

12. The communication method of claim 11 wherein the assigning, by the base station device, of the one of the plurality of second priority values to each of the communication devices within the vehicle includes assigning, by the base station device, the one of the plurality of second priority values to each of the communication devices within the vehicle based on a location within the vehicle each of the communication devices.

13. The communication method of claim 12 wherein the assigning, by the base station device, of the one of the plurality of second priority values to each of the communication devices within the vehicle includes assigning, by the base station device, the one of the plurality of second priority values to each of the communication devices within the vehicle using data defining a boundary of each of a plurality of zones within the vehicle, wherein one of the plurality of priority values is assigned to one of the plurality of zones.

14. The communication method of claim 12 wherein the assigning, by the base station device, of each of the types of traffic being transmitted or received by the communication device to one of the first transceiver and the second transceiver includes assigning, by the base station device, each of the types of traffic being transmitted or received by the communication device to one of the first transceiver and the second transceiver based on a cost of communication using the first network and a cost of communication using the second network.

15. The communication method of claim 13 wherein the assigning, by the base station device, of each of the types of traffic being transmitted or received by the communication device to one of the first transceiver and the second transceiver includes assigning, by the base station device, each of the types of traffic being transmitted or received by the communication device to one of the first transceiver and the second transceiver based on a speed of communication using the first network and a speed of communication using the second network.

16. The communication method of claim 14, further comprising:
measuring a volume of each of the types of traffic being transmitted or received by each of the communication devices within the vehicle; and
measuring a volume of each of one or more types of traffic being received by each of the communication devices within the vehicle,
wherein the assigning, by the base station device, of each of the types of traffic being transmitted or received by the communication device to one of the first transceiver and the second transceiver includes assigning, by the base station device, each of the types of traffic being transmitted or received by the communication device to one of the first transceiver and the second transceiver based on the volume of each of the types of traffic being transmitted or received by each of the communication devices within the vehicle, and the volume of each of one or more types of traffic being received by each of the communication devices within the vehicle.

17. The communication method of claim 12 wherein the assigning, by the base station device, of each of the types of traffic being transmitted or received by the communication device to one of the first transceiver and the second transceiver includes assigning, by the base station device, each of the types of traffic being transmitted or received by the communication device to one of the first transceiver and the second transceiver based on utilization of the one or more processors.

18. The communication method of claim 12 wherein the assigning, by the base station device, of each of the types of traffic being transmitted or received by the communication device to one of the first transceiver and the second transceiver includes assigning, by the base station device, each of the types of traffic being transmitted or received by the communication device to one of the first transceiver and the second transceiver based on utilization of the first transceiver.

19. The communication method of claim 18 wherein the assigning, by the base station device, of each of the types of traffic being transmitted or received by the communication device to one of the first transceiver and the second transceiver includes assigning, by the base station device, each of the types of traffic being transmitted or received by the communication device to one of the first transceiver and the second transceiver based on utilization of the second transceiver.

20. The communication method of claim 12, further comprising:
  receiving, by the base station device, a message from the first network that enables access to pay-per-view content provided by the second network.

* * * * *